May 17, 1966  M. NEWNAN  3,251,201
WARP-KNITTED OPEN-MESH CASING FOR MEAT AND OTHER FOOD PRODUCTS
Filed July 23, 1965  2 Sheets-Sheet 2
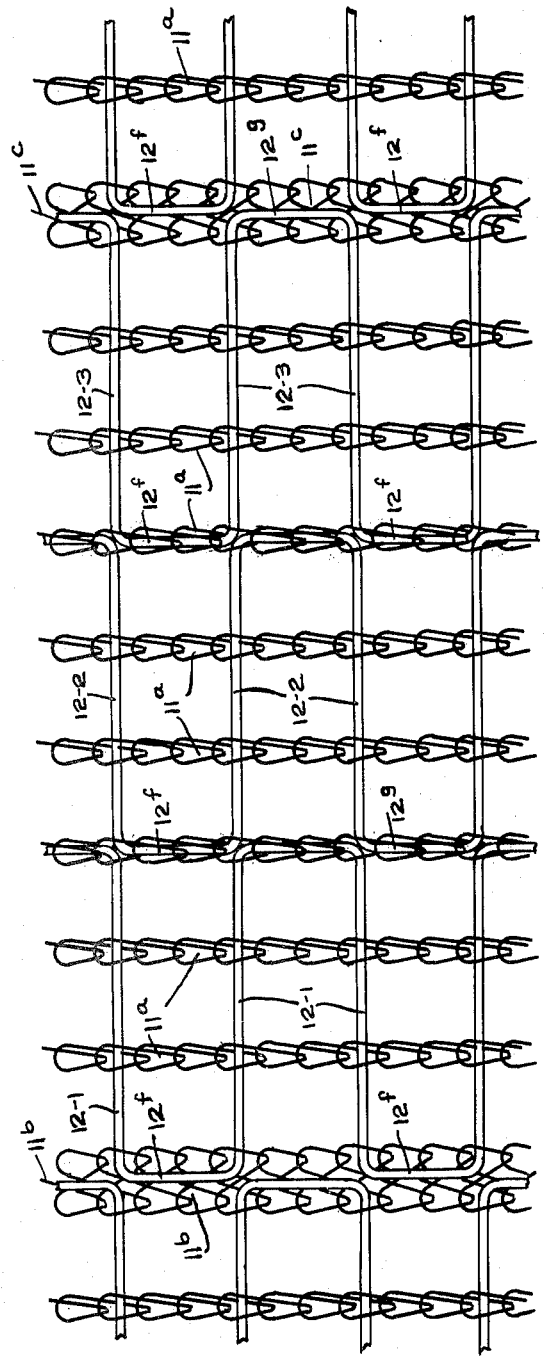
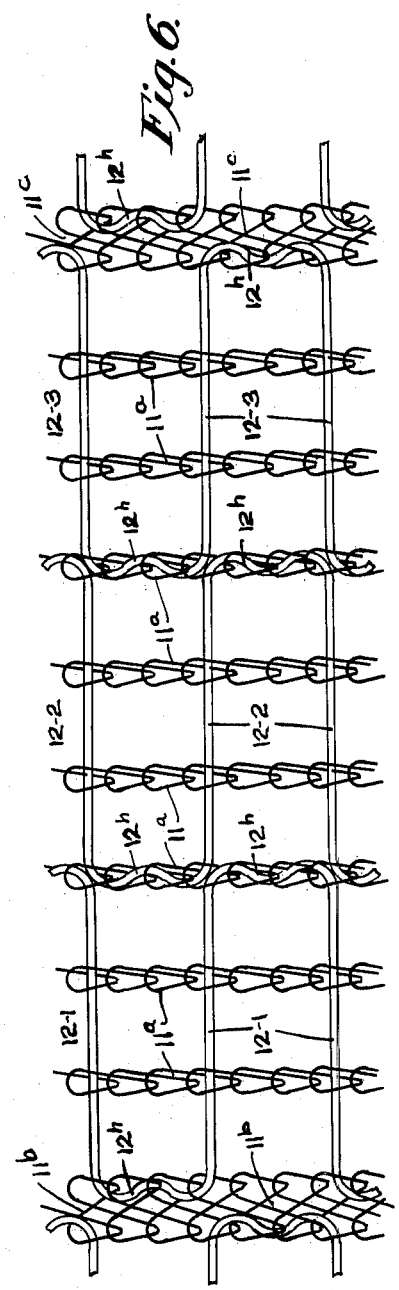
INVENTOR.
MILTON NEWMAN
BY
ATTORNEY.

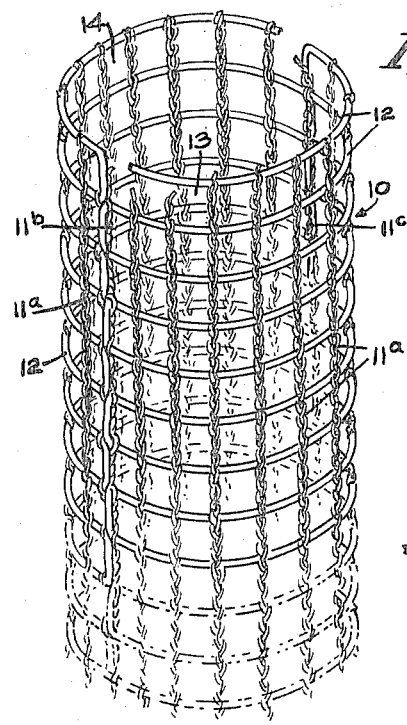
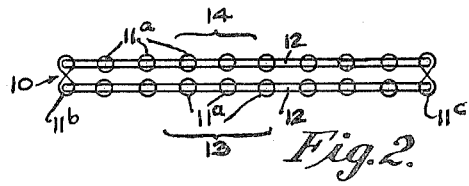
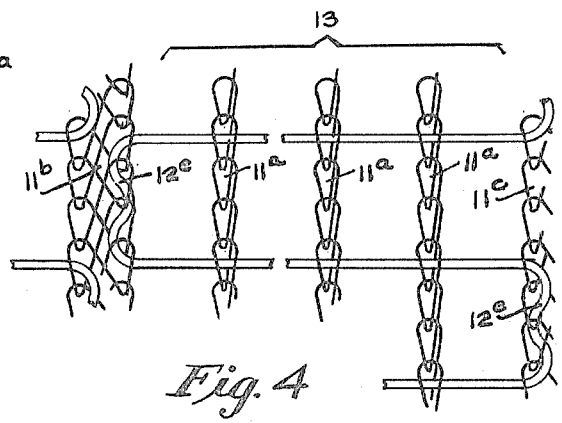
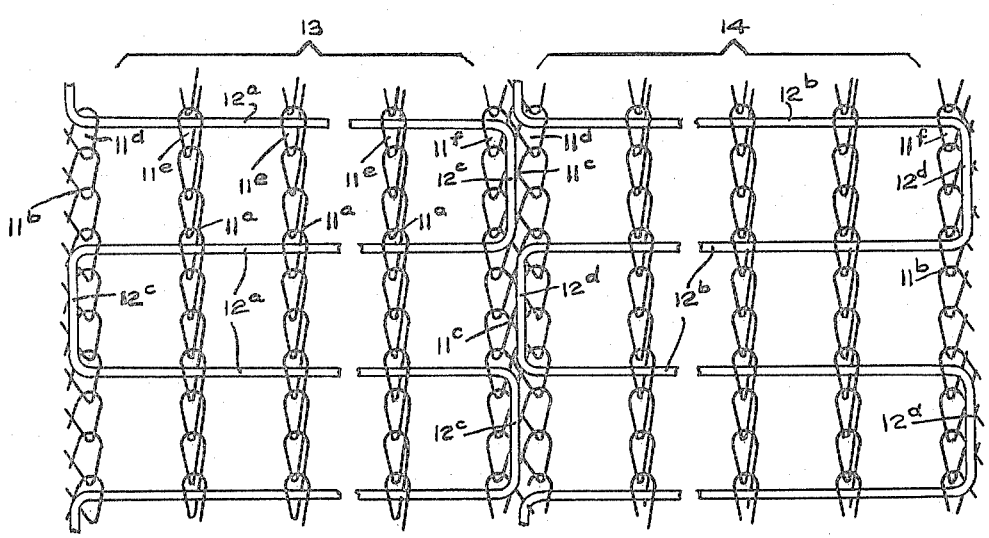

United States Patent Office 3,251,201
Patented May 17, 1966

3,251,201
WARP-KNITTED OPEN-MESH CASING FOR MEAT AND OTHER FOOD PRODUCTS
Milton Newman, 6211 N. 11th St., Philadelphia, Pa.
Filed July 23, 1965, Ser. No. 474,379
5 Claims. (Cl. 66—192)

This invention relates generally to warp-knitted fabrics and more particularly to an improved construction of a stretchable warp-knitted tubular open-mesh netting designed primarily for use as a shape-retaining cover for various processed food products, such as meat, cheese and the like.

A relatively recent innovation in the packing of meat products, such as sausage, meat loaves, roasts and the like, is the use of a tubular, non-stretchable net which is fitted over the product and serves to hold the same in its predetermined shape during the processing of the product and until such time as the net is removed by the consumer. Such non-stretchable nets, by their very nature, are usable, however, only in the processing of products which do not measurably vary in size and shape from a predeterminedly established standard size and shape and thus such nets are required to be made up in a large number of different sizes and shapes to conform to and accommodate the pre-sized and pre-shaped products which are to be encased by the nets.

There are certain meat products, such as meat roasts, which are also susceptible of being netted to a fixed shape but since the shape is not uniform as between various roasts even of the same weight, it has been found necessary and the present invention has as its object to provide a stretchable tubular open-mesh netting which may be stretched over an irregularly shaped food product, e.g., a meat roast, to hold and retain it in its desired shape not only during the cooking of the product but also until such time thereafter that the netted product is to be consumed, at which time the net is removed by the consumer.

Having in mind the foregoing, it is among the principal objects of the present invention to provide a stretchable warp-knitted open-mesh tubular netting which is fabricated in a complete circumferentially continuous form upon a warp-knitting machine, thereby eliminating subsequent seaming operations and thus effecting substantial economies in the manufacture of the desired netting.

Still another object is to provide a stretchable warp-knitted open-mesh tubular netting of indefinite length which may be made in a limited number of diametric sizes, any one of which may be selected to accommodate products of more or less greatly varying size and shape, the size of netting selectively employed being, of course, dependent upon the size and shape of the product to be encased.

Other objects and advantages of the invention will appear more fully hereinafter, it being understood that the present invention consists substantially in the combination, construction, location and relative arrangement of the several yarns composing the netting, and in the method of fabricating the same, all as will be described in detail hereinafter, as shown in the accompanying drawings and as finally pointed out in the appended claims.

In the accompanying drawings, which are illustrative of certain preferred constructions of the netting embodying the principles of the present invention:

FIGURE 1 is a perspective view of a tubular warp-knitted open-mesh netting of the present invention;

FIGURE 2 is a top plan view of the netting shown in its flattened condition as produced upon the knitting machine;

FIGURE 3 is an enlarged diagrammatic view showing the relative disposition of the several yarns employed in the knitting of the netting, the opposite panels thereof being shown cut apart and extended in coplanar relation;

FIGURE 4 is a view similar to that of FIGURE 3 but showing a modified arrangement of the weft yarns which are laid into the warp-knit chain stitches to form the open-mesh fabric of the netting; and FIGURES 5 and 6 are views, each similar to that of FIGURE 3, but showing still other modified arrangements of the weft yarns relatively to the warp-knit chain stitches.

Referring now to the drawings, and more particularly to FIGURE 1, it will be observed that the netting 10 of the present invention is in the form of an open-mesh tubular construction which is knitted of indefinite length upon a warp-knitting machine to produce a plurality of transversely spaced parallel lines of chain stitches 11a extending warp-wise of the netting which are interlaced and joined together by sinuously laid-in yarns 12 to form the weft-wise extending yarns of the netting. Each of the chain stitches 11a is knit of an inextensible single end of textile yarn, while the weft-wise extending yarns of the tubular knit fabric are formed of so-called elastic yarns, such as those having cores of rubber or other elastic material covered with cotton or other textile thread.

It will be noted that the tubular netting 10 of the present invention is in actuality formed of two warp-knitted panels which are referred to for convenience as the back and front panels, even though both are of identical construction. These back and front panels are respectively designated 13 and 14 in FIGURE 2, both being simultaneously knit as flat panels upon a warp-knitting machine having two banks of needles arranged in back-to-back relation to provide each panel with an equal number of uniformly spaced warp lines of chain stitches. The chain stitches 11a which are disposed between the opposite extreme side or selvage edges of each panel are all of single loop or simple chain stitch construction, these single loop chain stitches for each of the front and back panels being formed upon that bank of needles of the machine upon which the particular panel is knit.

The lines of chain stitches 11b and 11c which are formed along the opposite sides or selvage edges of the panels 13 and 14 are, however, each common to both panels, these chain stitches 11b and 11c which are of double loop formation, as best shown in FIGURES 3 and 4, being each formed of a single end of yarn which is commonly delivered to both of the needles which form the selvage edge line of double loop chain stitches. Since there are two panels which have their corresponding side edges joined together, two lines of these double loop chain stitches are knit, one at each end of the needle array.

Thus, it will be understood that in knitting the tubular netting 10 as shown in FIGURE 1, all of the single-loop chain stitches 11a of the front panel 13, and all of the single-loop chain stitches 11a of the back panel 14 are respectively formed upon separate banks of needles arranged in closely spaced back-to-back relation, while simultaneously the warp-knit lines of double-loop chain stitches 11b and 11c, each of which is common to both the front and back panels, are formed upon needles of both banks operating in concert with one another. It is to be observed further, that the chain stitches, both of the single loop and of the double loop formation, are uniformly spaced warp-wise of the fabric as it is being knit, in consequence of which the chain stitch loops are arranged in circumferentially extending parallel rows or courses thereof throughout full length of the fabric.

Each of the extensible or elastic yarns 12 extends weft-wise of the fabric in a back and forth sinuous path across spaced courses of the warp-knit chain stitches, these weft yarns 12 being incorporated in the chain stitches in unknit relation, that is, merely laid in the chain stitches. One or more weft yarns may be employed in each of the two panels 13 and 14 which form the tubular netting.

Thus, in the construction illustrated in FIGURE 3, wherein the tubular knit fabric is shown cut apart along one of the double-loop chain stitch lines and spread open into flat condition, single ends of elastic yarn 12a and 12b are respectively employed to form the weft runs of the panels 13 and 14. In this instance, the weft yarn 12a for the panel 13, extends from one loop 11d of the double loop chain stitch 11b at the left hand end of said panel, through the loops 11e of a given course the intermediate single loop chain stitches 11a and then through one loop 11f of the double loop chain stitch 11c at the right hand end of said panel 13. The weft yarn 12a then floats, as at 12c, along a predetermined number of the double loop chain stitches, and then extends weft-wise in reverse direction through the loops 11g of another course of the intermediate single chain stitches to and through another loop 11d of the double loop chain stitch 11b at the left hand end of the panel 13. This sinuous laying in of the weft yarn 12 is continued throughout the length of the panel 13 as it is knitted, to thereby produce in said panel a series of openings the size of which depends upon the weft-wise spacing of the chain stitches and the warp-wise spacing of the weft yarn extending sinuously across the adjacent lines of the warp chain stitches. It will be noted that in the formation of the panel 13 as just described, the "floating" portions of the weft yarn, that is, the bight portions 12c thereof, which extend along a predetermined number of successive chain stitches, are disposed in uniformly spaced relation along the length of the warp chain stitches, said bight portions 12c being arranged in alternating relation warp-wise of the fabric with successive bight portions disposed alternately at opposite sides of the panel.

The same pattern is followed for the panel 14 excepting that the weft yarn 12b is sinuously laid into the warp chain stitches of said panel in such manner that the bight portions 12d thereof respectively alternate in position with the bight portions 12c of the weft yarn 12a of the panel 13 along the lines of the double loop warp knit chain stitches 11b and 11c. It will be noted further that the weft yarn 12b of the panel 14 extends through those loops of the double loop chain stitches which are paired with the loops traversed by the weft yarn 12a of the panel 13. In the construction of FIGURE 3, the paired loops of each double loop chain stitch are those respectively designated 11d and 11f, it being noted that these paired loops are disposed in the same weft-wise course of the fabric. Thus, the weft yarns extend through a circumferentially complete weft-wise course of chain stitches, with the weft runs spaced apart to the extent of whatever chain stitch spacing may be desired. In the construction shown in FIGURES 3 and 4, the weft yarn spacing is on the order of a weft run through every fourth course of chain stitches. It will be understood, of course, that any desired spacing of the weft runs as well as any desired spacing of the warp knit chain stitches may be employed to obtain the desired size of the openings through the netting.

In the modified construction of the netting as shown in FIGURE 4, the chain stitches are like those of FIGURE 3. However, the reversal loop or bight portions 12e of the elastic weft yarns extend warp-wise through and are thus interlocked with all of the loops of the double loop chain stitches which extend between successive weft-wise runs of the weft yarn, thereby eliminating the "floating" arrangement of the weft yarn bight portions as shown in the construction of FIGURE 3. More specifically, it will be noted that in the modified arrangement of FIGURE 4, the weft yarn which extends back and forth through spaced courses of the chain stitches of each of the two interconnected panels of the tubular netting traverses each chain stitch along the length of the sinuously extending weft yarn.

FIGURE 5 shows still another variation in construction of the netting, it being observed that in this variation each of the front and back panels of the netting includes three ends of weft yarn respectively designated 12-1, 12-2 and 12-3. Each of these weft yarns extends sinuously across a predetermined number of chain stitches less than the total number employed in a given panel. (In the illustration of FIGURE 5, each of said plural number of weft yarns extends coursewise across four lines of chain stitches, which number of chain stitch lines so traversed by a single weft yarn may be varied as desired.) It will be noted that where a plurality of weft yarns are employed to form the weft runs extending coursewise between the two lines of double-loop chain stitches, as in the arrangement of FIGURE 4, the left-hand reversal loops 12f of a given weft yarn alternate warp-wise with the right hand reverse loops 12g of the next adjoining weft yarn, in consequence of which the netting fabric is composed of contiguous weft yarns extending about the full circumference of the tubular netting and through all of the warp knit chain stitches constituting a given course thereof.

The construction illustrated in FIGURE 6 is generally similar to that of FIGURE 5 except for the fact that the reversal loops or bight portions 12h of the sinuously extending weft yarns extend through successive stitches of the warp-knit chain thereof to thereby interlock the warp-knit chain stitches with the reversal loops of the weft yarns. This interlocking of weft yarn with chain stitches, sometimes referred to as "rick-racking," is similar to that shown in FIGURE 4 and, of course, eliminates the "float" arrangement of the weft yarn reversal loops of the constructions shown in FIGURES 3 and 5.

As has been pointed out hereinbefore, in all of the constructions shown and described, the corresponding side edges of each of the front and back panel portions of the netting which opposite side edges normally constitute the selvage edges of a single warp-knit fabric blank, are interknit by the double loop chain stitches during the operation of simultaneously knitting the two blanks each upon its own bank of needles arranged in back-to-back relation in the warp-knitting machine. Consequently, the fabric as it leaves the machine is of the flat, double-paneled formation shown in FIGURE 2 with the corresponding sides of the two panel interknit by the double loop chain stitches to form a circumferentially complete tubular fabric which may be diametrically expanded, by virtue of the elastic weft yarns, to fit over and snugly encase and so hold to its predetermined shape the product for which the netting has been designated, such as a roast or other irregularly shaped food product. Of course, the netting may be made in a range of sizes each adapted to accommodate products which vary within limits in size and shape, and also the weft yarns may be of any desired degree of elasticity to provide, as desired, the netting with the requisite stretch and shape-retaining capability.

It will be understood that the present invention is susceptible of various changes and modifications which may be made from time to time without departing from the general principles or real spirit thereof, and it is accordingly intended to claim the said invention broadly, as well as specifically, as indicated in the appended claims.

What is claimed as new and useful is:

1. A tubular warp-knitted open-mesh netting comprising a pair of identical flat warp-knit fabrics each having a plurality of laterally spaced parallel lines of warp-knitted chain stitches providing courses of said chain stitches extending transversely of the chain stitch lines and at least one elastic weft yarn interlaced in sinuously extending pattern through warp-wise spaced courses of said chain stitches, said weft yarn being reversely turned at opposite selvage edges of the fabric to provide bight portions which extend warp-wise along lines of chain stitches defining said opposite selvage edges of the fabric, said pair of fabrics being knit in back-to-back relation with their corresponding selvage edges joined together by said selvage edge-defining lines of chain stitches, the bight portions of the weft yarn in one of said pair of fabrics being disposed in alternating relation with the bight portions of the weft yarn in the other of said pair of fabrics along each line of chain stitches which join together the corresponding selvage edges of the fabric.

2. A tubular warp-knitted open-mesh fabric as defined in claim 1 wherein the warp-knit chain stitches which join together the corresponding selvage edges of the pair of fabrics are of double-loop formation, said double-loop chain stitches each including a pair of interconnected loops one of which is common to one of said fabrics and the other of which is common to the other of said fabrics.

3. A tubular knit warp-knitted open-mesh fabric as defined in claim 2 wherein said alternating bight portions of the weft yarns are disposed along the line of said double-loop chain stitches with the bight portions of the weft yarn of one fabric passing through those warp-wise spaced loops of the double-looped chain stitches which are common to said one fabric, while the bight portions of the weft yarn of the other fabric pass through those warp-wise spaced loops of the double-looped chain stitches which are common to the other fabric.

4. A tubular warp-knitted open-mesh fabric as defined in claim 2 wherein each fabric includes a plurality of elastic weft yarns each of which extends sinuously across a predetermined limited number of said chain stitches and wherein the bight portions of adjoining weft yarns in each fabric alternate warp-wise along a chain stitch line common to said adjoining weft yarns.

5. A tubular warp-knitted open-mesh fabric as defined in claim 2 wherein the bight portions of the weft yarn in each fabric is interlaced with successive chain stitches extending between the weft-wise courses of the weft yarn.

References Cited by the Examiner

UNITED STATES PATENTS

| 459,866 | 9/1891 | Clewley | 66—170 |
| 1,266,459 | 5/1918 | Hahn | 66—87 |
| 2,485,307 | 10/1949 | Newman | 66—193 |
| 2,518,407 | 8/1950 | Weinberg | 66—193 |
| 3,178,910 | 4/1965 | Hammerle | 66—170 |

FOREIGN PATENTS

| 988,173 | 4/1965 | Great Britain. |

MERVIN STEIN, *Primary Examiner.*

P. C. FAW, *Assistant Examiner.*